United States Patent [19]

Favareto et al.

[11] 4,409,464

[45] Oct. 11, 1983

[54] AUTOMATIC DEVICE FOR CHANGING AN ELECTRIC WELDING GUN, OPERATED BY THE ARM OF A PROGRAMMABLE MANIPULATOR

[75] Inventors: Marcello Favareto, Rivoli; Renato Anselmino, Turin, both of Italy

[73] Assignee: Comau S.p.A., Turin, Italy

[21] Appl. No.: 274,237

[22] Filed: Jun. 16, 1981

[30] Foreign Application Priority Data

Jun. 26, 1980 [IT]  Italy ............................. 67994 A/80

[51] Int. Cl.³ ............................................. B23K 9/24
[52] U.S. Cl. ................................... 219/136; 219/86.8; 219/125.1
[58] Field of Search ................ 219/125.1, 136, 137.31, 219/137.62, 86.8

[56] References Cited

U.S. PATENT DOCUMENTS

| | | | |
|---|---|---|---|
| 3,148,264 | 9/1964 | Clark | 219/86.8 |
| 4,142,086 | 2/1979 | Rotillo | 219/136 |
| 4,307,279 | 12/1981 | Inoue | 219/69 M |
| 4,316,071 | 2/1982 | Bonga | 219/69 E |

FOREIGN PATENT DOCUMENTS 664784  5/1979  U.S.S.R. ............................. 219/86.8

Primary Examiner—Elliot A. Goldberg
Attorney, Agent, or Firm—Young & Thompson

[57] ABSTRACT

An automatic device for changing an electric welding gun, operated by the arm (11) of a manipulator, in which two elements (10, 50), one carried by the manipulator arm and the other by the gun, can be connected together by the first element being made to approach and fit into the second; each element is provided with ducts (13) for passage of the liquid for cooling and controlling the opening of the electrodes (63); valve units (31) connect said ducts (13) to each other when the two elements (10, 50) are fitted together; the approach of the two elements is guided and checked, and hydraulically controlled hook portions (42, 71) lock together and separate the elements in accordance with the programming of the manipulator; each element is also provided with male cones (66) and female cones (16) provided on or in copper units (14) in order to fit into each other and establish electrical contact between the manipulator and gun.

8 Claims, 14 Drawing Figures

AUTOMATIC DEVICE FOR CHANGING AN ELECTRIC WELDING GUN, OPERATED BY THE ARM OF A PROGRAMMABLE MANIPULATOR

The invention relates to an automatic device for changing an electric welding gun, operated by the arm of a programmable manipulator.

The main object of the invention is to completely automate the change-over of an electric welding gun operated by a programmable manipulator, whether the welding transformer is incorporated in the manipulator or is of the overhead type.

It becomes necessary to change a welding gun when, during determined welding cycles, it becomes impossible to penetrate into each recess in the piece to be welded with a single type of gun, and it is therefore not possible to make proper welds without replacing the gun with others of different shapes and dimensions.

Another case in which change-over is necessary occurs when it is undesirable to incorporate into the cycle other welding machines carrying a gun more suitable for the specific operation, or again when it is required to carry out other welding operations on a different line during the down-times of the main cycle.

It is obvious that to operate under such conditions, even with automatic means, is extremely costly and of poor efficiency.

For these reasons, the invention proposes to provide an automatic changing device for welding guns which obviates all difficulties by means of two simple and rapid movements of the manipulator, the first of which releases the gun which has already executed part of the cycle, and breaks the connections (water for cooling the electric contacts and electrodes, oil for the electrode closing cylinder), and the second of which couples the new gun and simultaneously re-makes the said connections without creating losses of pressurised service liquids, so that the cycle which was interrupted a moment previously can be continued.

The proposed device, which is disposed between the end of the arm of a programmable manipulator and the electric welding gun, consists of two separable main parts securely fixed together, which carry in a self-contained manner all the linkages and service connections necessary for the correct operation of the system.

In this manner a coupling arrangement is provided between two parts, one of which is permanently fixed to the manipulator arm and the other of which is fitted to each gun to be used for all necessary applications, and is thus fitted to the end of welding guns of all shapes and sizes, but is itself always identical so that it can be perfectly coupled to the fixed part and to all the linkages and connections contained thereon.

These and further objects which will be more apparent hereinafter are attained according to the present invention by an automatic device for changing an electric welding gun, operated by the arm of a programmable manipulator and disposed between the end of the arm of a programmable manipulator and an electric welding gun, characterised by comprising two elements which are rigid with the manipulator arm and the welding gun respectively, and which can be connected together in a separable manner; there being provided means for checking the correct selection of the chosen type of gun and for checking that the element carried by the arm has properly approached this latter, lead-in guide means between the two elements for their mutual insertion, means for releasably coupling together the two elements at the end of their mutual insertion movement, and valve units which automatically open during the coupling together of the two elements in order to directly connect together the ducts in the two elements for the passage of the liquid for cooling the electrical contacts and electrodes and the oil for the electrode closing cylinder, the electrical connection between the manipulator and gun being made by means of male and female contacts, the one provided on the element rigid with the arm and the other in the element rigid with the gun and being coupled together at the moment in which said elements become connected together.

Two embodiments of the device according to the invention are described hereinafter by way of non-limiting example with reference to the drawings in which.

Figure 1:
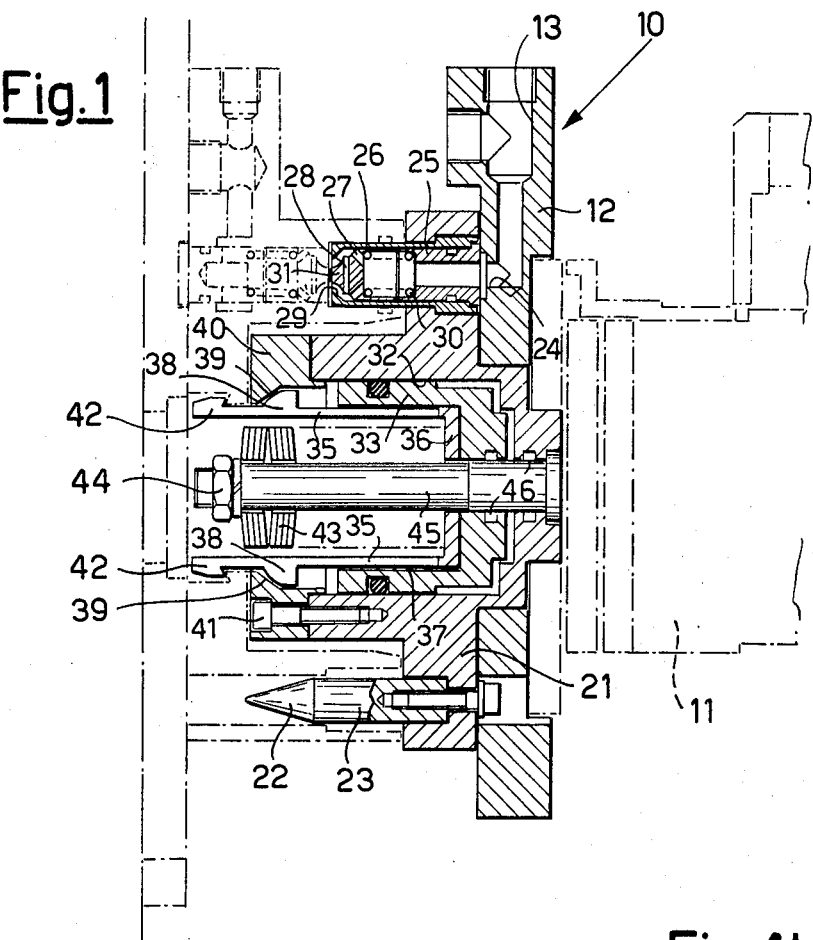
FIG. 1 is a section on the line I—I of FIG. 2, which is a front view of a detail of the device according to the invention.

FIGS. 1 and 4 show the main part 10, which is fixed by screws to the end 11 of the manipulator arm (shown here by dashed and dotted lines). Said part 10 is formed from a plate 12, the upper zone of which comprises bores 13 which serve for receiving the pipes for the cooling water and oil which operates the electrode closing cylinder of the welding gun. Said bores 13 are formed such that their outlets lie in a predetermined position, from which they continue as described hereinafter.

Figure 2:
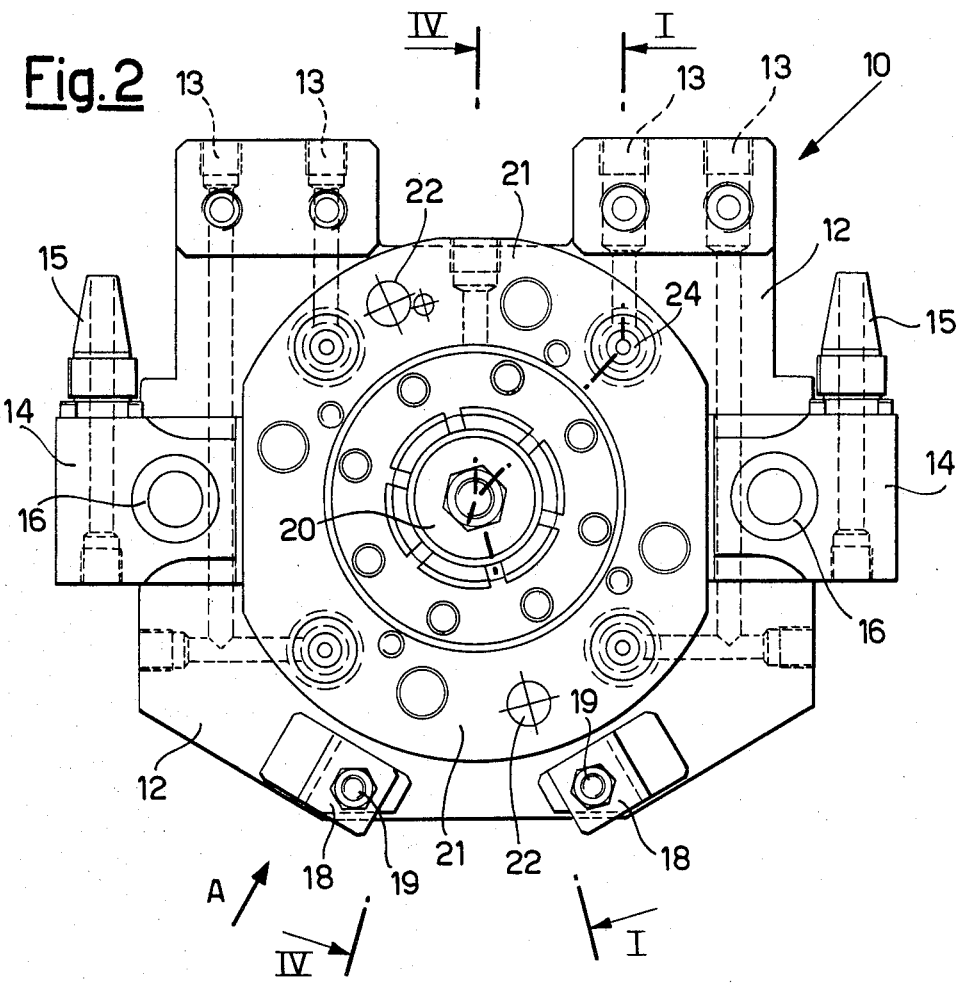

Two copper blocks 14 (FIG. 2) each comprising contact cones (a bored male cone 15 for cooling purposes and a female cone 16 for the passage of electric current) are fixed laterally to said bored part, one on each side, by way of insulation. Two brackets 18 are fixed by screws 17 to the lower part of the plate 12, and each carries a proximity sensor 19 which, by being acted upon or not according to the case in point, identifies the type of gun carried (this device is better illustrated in FIG. 3).

Finally, the central part of the plate 12 comprises a bore 20 which serves for centering an intermediate member 21.

The intermediate member 21 fixed to the plate 12 carries two very tapering cones 22 which from their base extend in the form of a cylinder 23 (FIG. 1), they being used for centering purposes when the two separable main parts, namely that heretofore described fixed to the arm and that described hereinafter fixed to the gun, are in a facing position. The periphery of the intermediate member 21 comprises bores 24 perpendicular to the support surface, these corresponding in position with the bores 13 when the plate 12 is in a predetermined position, and being designed to contain the sleeves 25 (FIG. 1) of the valve units for the passage of the service liquids. Said valve units are constituted by a plunger 26 which slides in the sleeve 25, and is provided with peripheral bores 27 for the passage of the liquids and with a seal gasket 28 which, when the main parts are separated, engages with and is kept held by means of a spring 30 against a conical surface 29 provided in the end of the sleeve 25. Said plunger terminates in a stem 31 projecting from the sleeve 25, its purpose being to open the units (as illustrated in FIG. 1), as described hereinafter.

The centre of the intermediate member 21 comprises a large sized bore 32 which acts as a cylindrical housing for containing a slidable piston 33. A further bore 34 (FIGS. 4a and 4b) perpendicular to the preceding reaches with its lower end the interior of the bore 21, its purpose being to act as a passage for the oil for moving the said piston 33.

Figure 4A:
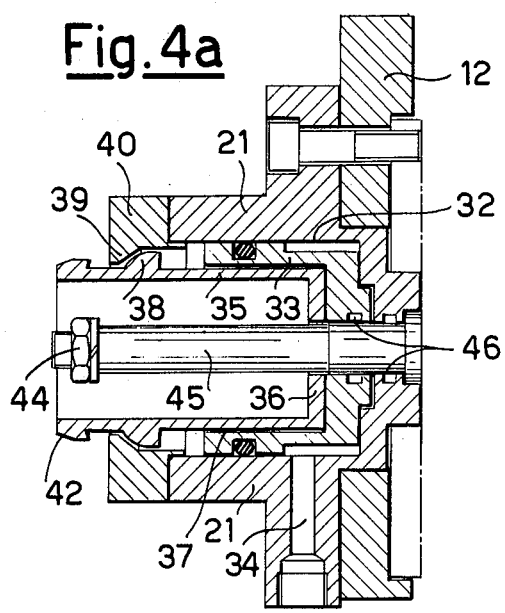
FIG. 4a and 4b are views of a detail of FIG. 1 in two different working positions.
Figure 4B:
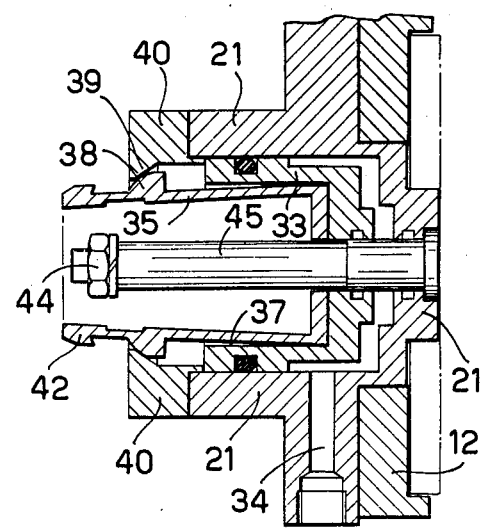

As can be seen in FIG. 1 and better in FIGS. 4a and 4b, the interior of the piston houses a sleeve 35, the end 36 of which rests against the piston 33, and the cylindrical body of which extends outwards with an annular gap 37, to enlarge as soon as it is outside its container into a larger diameter 38 with a front spherical surface which rests on a cone 39 provided in the plate 40 which closes the entire assembly by means of screws 41 which engage in the intermediate member 21.

The said sleeve 35 terminates externally to the plate 40 in a hardened edge 42 of particular shape, arranged to retain a body which strikes it and comprising longitudinal slots which make it resilient about its axis. Inside said sleeve 35 there is stacked a plurality of cup springs 43 kept in a preloaded position by means of a nut 44 engaged with a coaxial screw 45 which passes within the springs 43, and is sealed against annular gaskets 46 both against the piston 33 and against the intermediate member 21.

Figure 3:
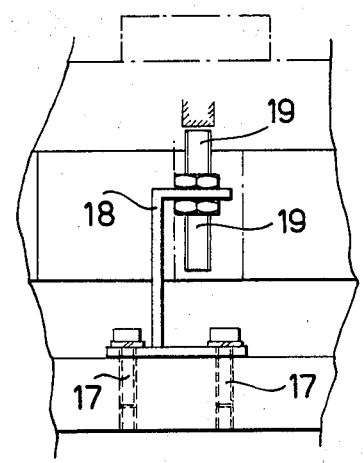
FIG. 3 is a view of a detail of FIG. 2 along the arrow A.
Figure 9:
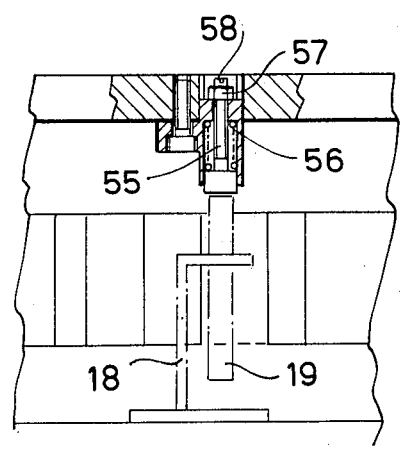
FIGS. 7, 8 and 9 are views of the detail of FIGS. 6 and 7 along the arrows B, C and D respectively.

The other separable main part 50 which is fixed to the electric welding gun (not shown) is shown in FIGS. 5 to 9, and consists of a plate 51, the centre of which comprises a bore 52 for centering the gun, and the periphery of which comprises bores for fixing it by screws to the upper member described hereinafter. The ends of the plate comprise lugs 53 provided with slots 54 which serve for guiding and centering the entire assembly when at rest on its support fitting to the side of the welding line. Into each of two of the lugs 53 (the lower outer part of FIG. 6) there is fixed a screw 55 supported by a spring 56 and held in the predetermined position by a nut 57 (see FIG. 9 in detail), the screw 55 comprising at the end of its threaded portion a slot 58 for adjusting the gap which arises relative to the sensor 19 disposed on the other separable part, and of which the purpose, as already described with reference to FIG. 3, is to recognise the type of gun which is coupled. In this respect, said sensor 19 is shown diagrammatically in FIG. 9 in its working position. The upper member 59 resting on said plate 51 is provided with bores 61 fitted with bushes 60 (see FIG. 9) which serve for receiving the cones 22 terminating in the cylinder 23 (described with reference to FIG. 1) and positioned on the other separable part 10, and which serve for centering when the two parts 10 and 50 face each other. Bores 62 are provided in a predetermined position in said member 59, and are designed to receive their own valve groups identical to those described with reference to FIG. 1 which exist on the other separable part 10, and which are in a facing position when the two parts are mutually inserted.

The constituent elements of the valve units will not be described as they are identical to those illustrated previously with the reference numerals 25-31.

Figure 5:
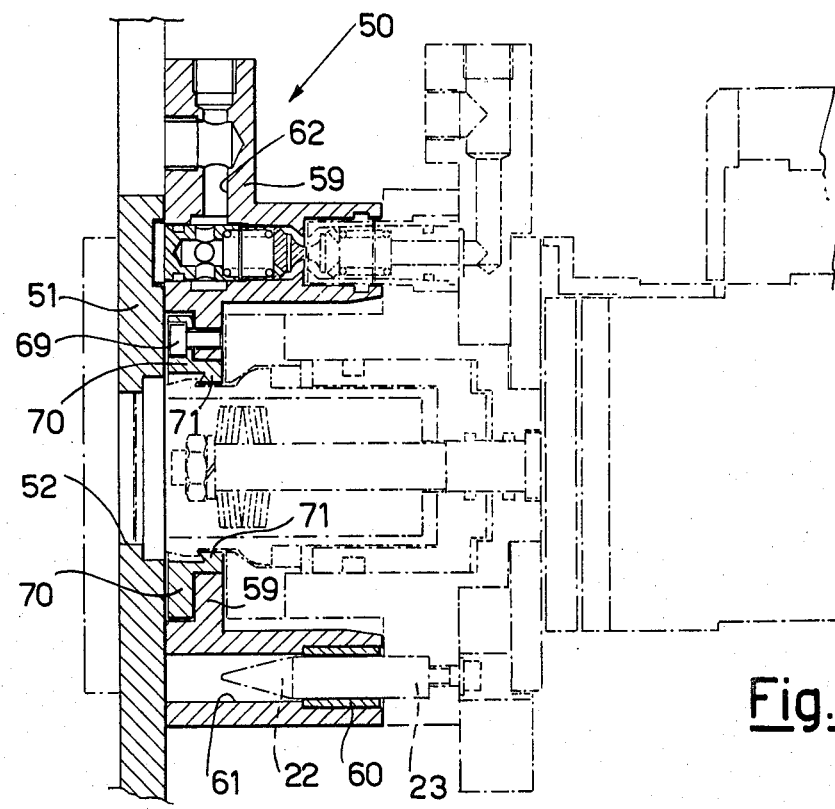
FIG. 5 is a section on the line V—V of FIG. 6, which is a front view of a further detail of the device according to the invention.
Figure 8:
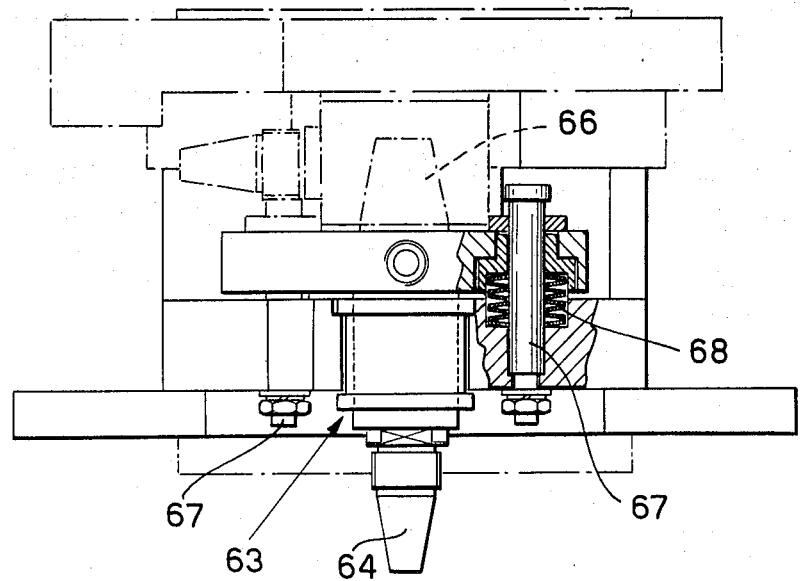
Figure 6:
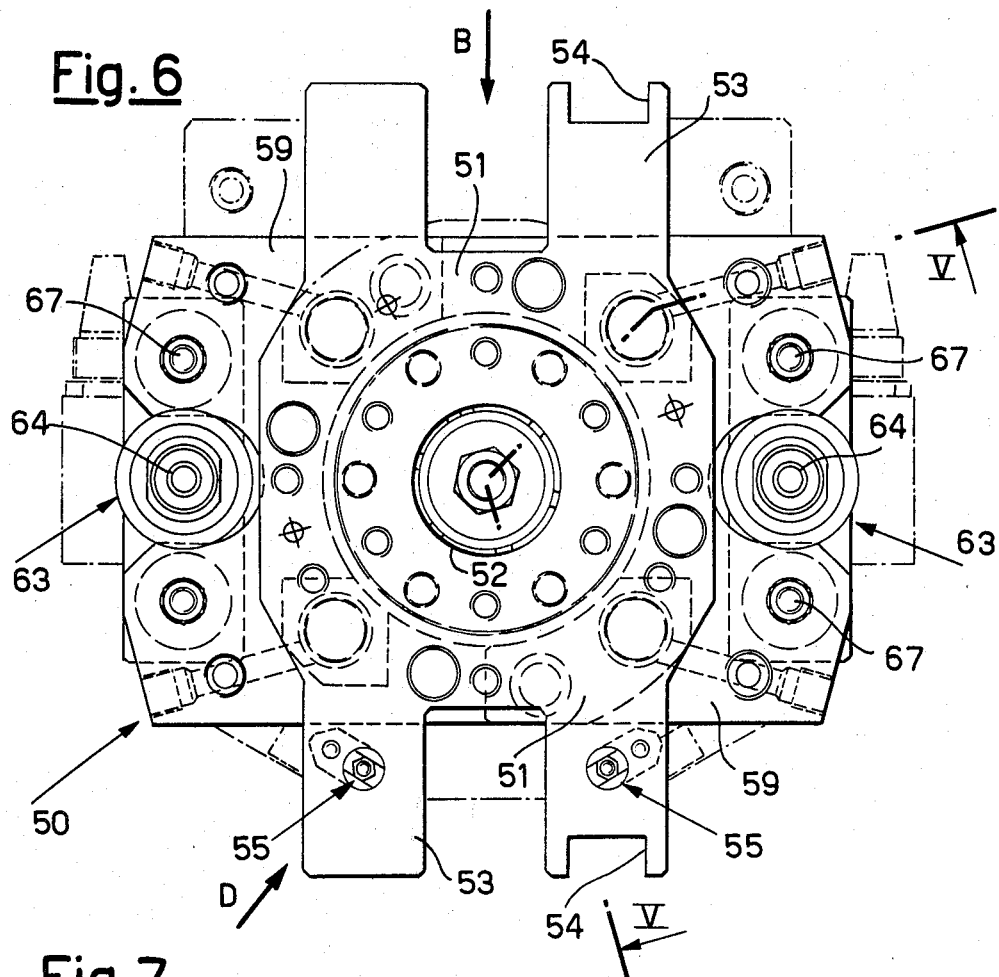
Figure 7:
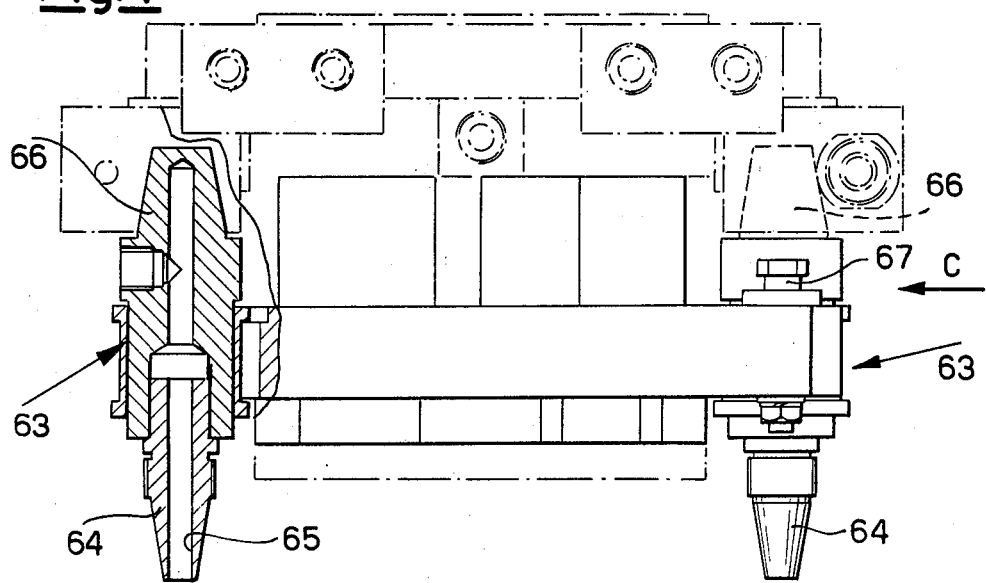
Figure 13:
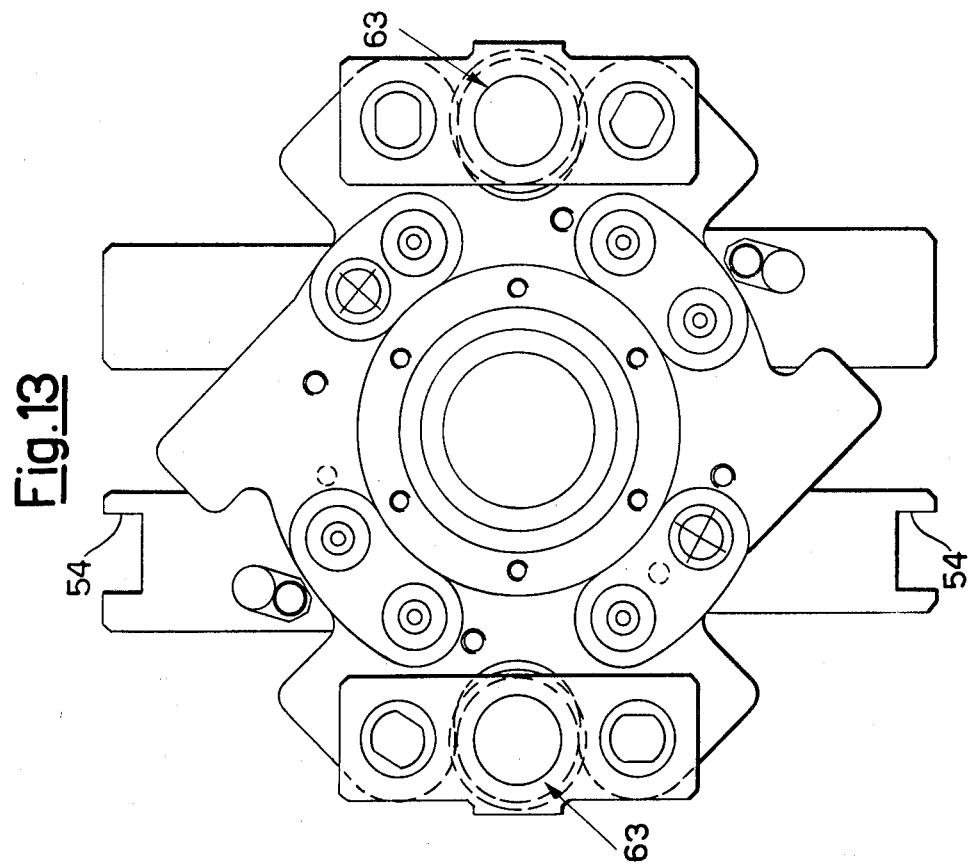
FIGS. 11, 12 and 13 are sections on the line XI—XI, XII—XII and XIII—XIII respectively, of the device of FIG. 10.
Figure 10:
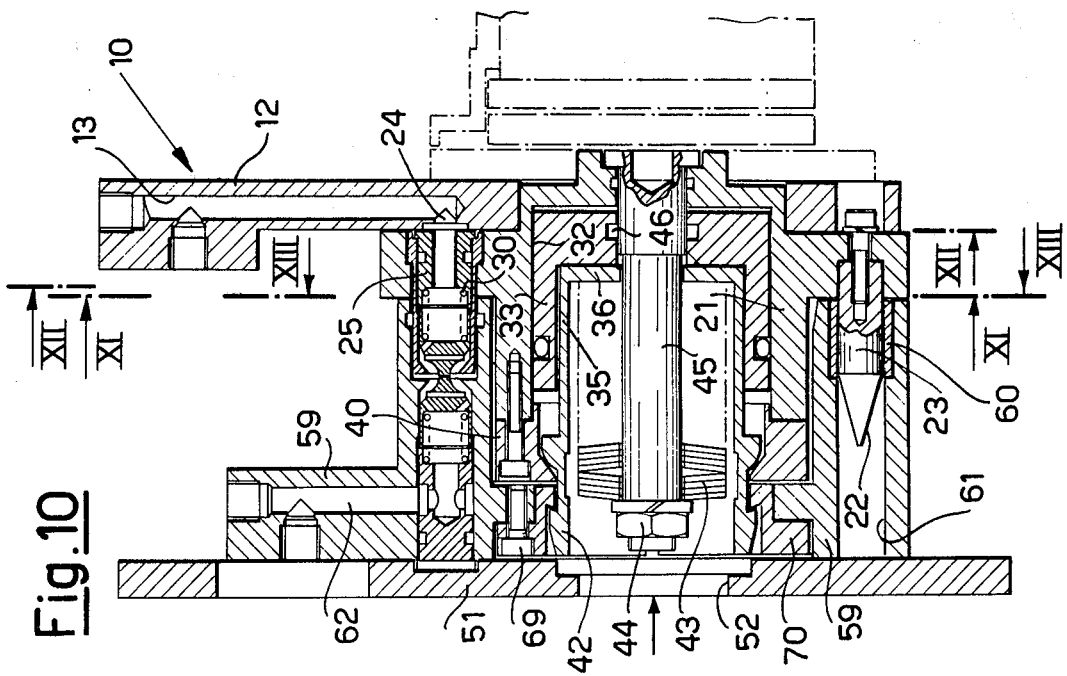
FIG. 10 is an axial section of a second embodiment of the device according to the invention taken through the two details of FIGS. 1 and 5 when coupled together.
Figure 11:
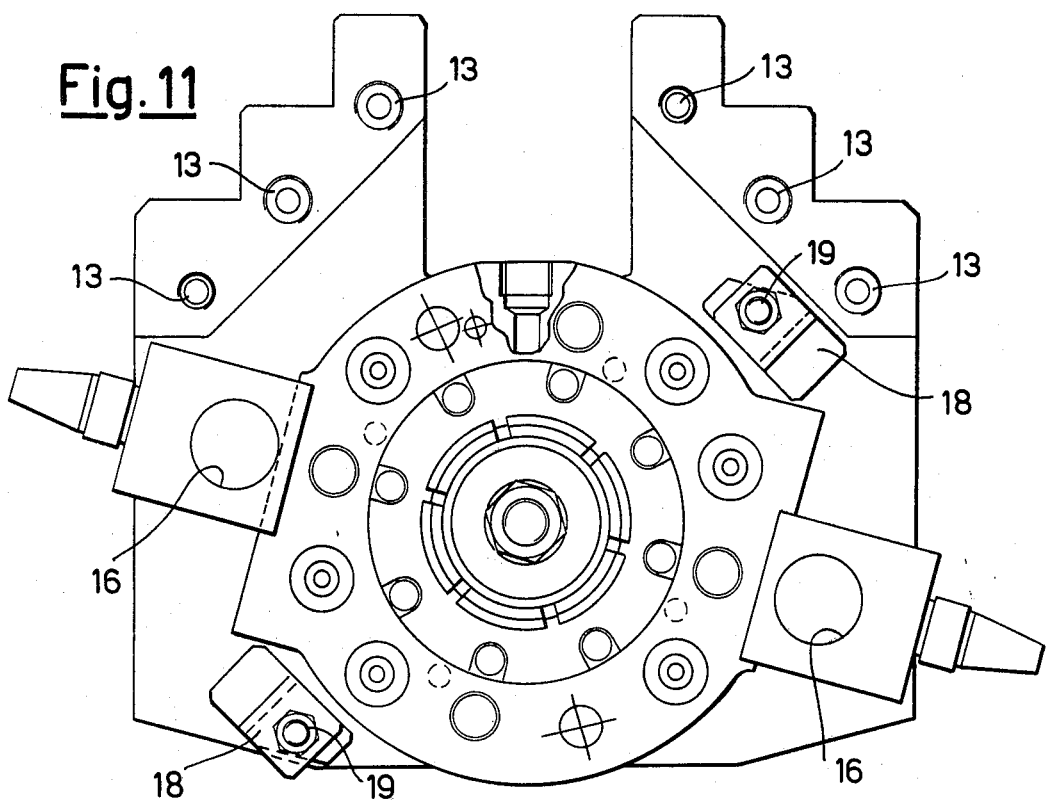
Figure 12:
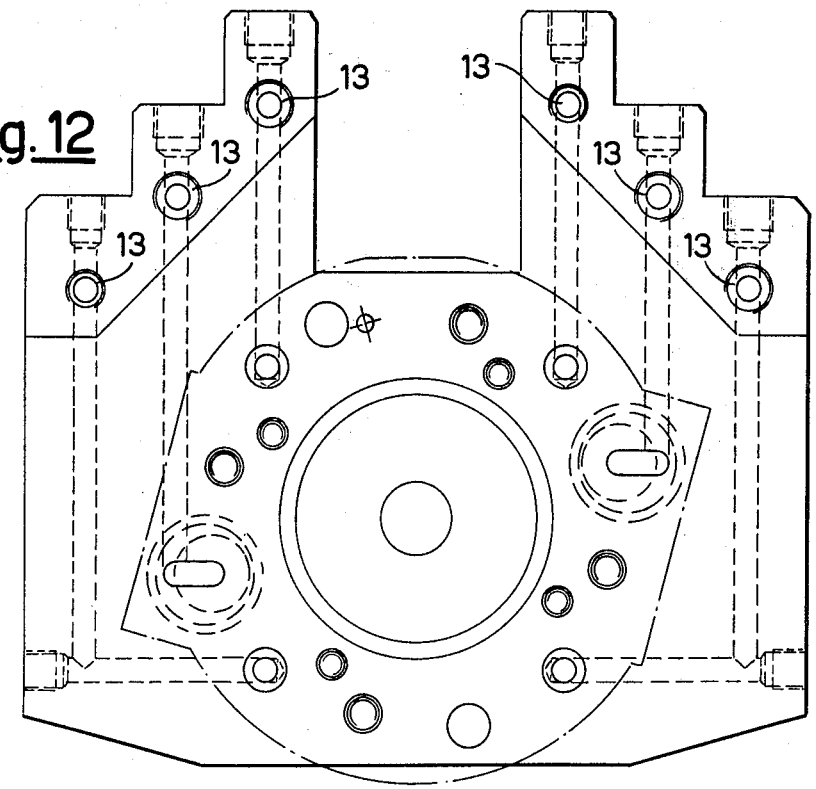

Two copper blocks 63 shown in FIG. 6 and more clearly in FIGS. 7 and 8 are fixed laterally to the upper member 59, one on each side, and insulated therefrom, these comprising two opposing conical ends 64 and 66 which are cooled by ducts 65 and allow passage of the welding current. The two conical ends 66 facing outwards mate with the respective conical bores 16 of FIG. 2 in the other separable part 10. In addition, besides being insulated from the rest of the apparatus, the copper blocks 63 are fixed resiliently to the upper member in order to ensure correct coupling of the electrical contacts in all cases, as can be seen in FIG. 8. Said resilient fixing is done by two screws 67 (one on each side of each block), which can slide along their own axis and into the respective containing compartment to co-axially engage the stacks of cup springs 68 which, when urged by the coupling of the cones 66, thrust these latter forcibly into the bores 16. The coupling member is enclosed in the central zone between the plate 51 and upper member 59, and is fixed by screws 69 to this latter, the said coupling member comprising a collar 70 (FIG. 5) of hard material which is coupled to and retained annularly in a stable manner on the sleeve 35 (FIG. 1) of the separable main part on the manipulator by means of the hook portion 71.

In addition to these components, the assembly can be provided with further oil passage bores fitted with identical valve units (as heretofore described) to allow partial closure of the gun, this operation being required (to save time) when more than one weld has to be made in a uniform zone.

The operation of the device heretofore described takes place as described hereinafter, account being taken of the fact that the electric welding guns can be more than two in number and being arranged on their own container support disposed to the sides of the line. At the beginning of the cycle, the programmable manipulator receives the starting signal from its control section, and the welding gun can either be coupled or not to the end of its arm, but for ease of description it will be assumed that the arm is not yet fitted with it.

The end 11 (FIG. 1) is already provided with its own separable main part 12 (common to all types of gun) which is already suitably connected to the service pipes by way of the ducts 13, 24, and to the welding current cables by way of the cones 15 and 16 of the blocks 14, whether dealing with the type in which the welding transformer is incorporated or the type in which the transformer is overhead, the closed valve units (as in FIG. 1) being connected to said pipes 13 and 24. On the basis of its programme data, said manipulator then moves the entire assembly towards the container support which supports the selected gun, which is already complete with its own separable main part 50 with its coupling and mating means facing upwards, and connected to said gun by way of its own hollow ducts 62 and valve units.

After this stage, the main parts lie facing each other but still spaced apart, and the descent operation then begins in which the cones 22, which are followed by cylinders 23 and are positioned on the intermediate member 21 of the main part 10 on the manipulator, engage the corresponding bores 61 comprising the bush 60 on the upper member 59 of the main part 50 fixed to the gun. As it continues its descent, the manipulator arm causes the two main parts 10 and 50 to increasingly approach each other, so that the valve units of the main part on the manipulator become inserted into the respective bores to form an annular seal (which prevents leakage of liquids when the valve units are opened). Contact between the valve units and thus their opening, with consequent direct communication between the ducts 13 and 62, takes place in the following manner.

The conical heads 31 of the two valve units project slightly from the surfaces of the sleeve 25 and member 59, the former of which is inserted into the latter, so that when they meet head-on, they urge in opposite directions the plungers 26 with which each head 31 is rigid. The condition shown in FIGS. 1 and 5 thus arises, in which the springs 30 are compressed and the plungers 26 have moved towards the end of each sleeve 26 in which they slide, so that the liquid contained in the duct 13, 24 passes through the cavity in the plunger 26 between the spring 30 and bores 27 to flow through the now open duct between the conical wall 29 of the sleeve 25 and the conical head 31, because the gasket 28 no longer rests against the outlet of the sleeve 25 provided at the point in which the sleeve abuts against the corresponding part of the element 59. The same happens in the case of the valve unit carried by the plate 59, so that the liquid originating from the open duct 13, 24, 27 flows towards the ducts 62 to establish the required continuity between the manipulator and gun. The male cones 66 and female cones 16 of the electrical contacts 63 and 14 also become coupled together, and are forcibly kept coupled by means of the cup springs 68 contained in the side compartments of the electrical assemblies 63 and guided by the screws 67 which keep the copper blocks 63 suspended.

At the same time, the activation signal arrives from the manipulator control system for the passage of pressurised oil through the pipe connected to the bore 34 of FIGS. 4a and 4b which leads to the cylinder 32 located in the centre of the intermediate member 21 of the separable main part 10 on the manipulator side. Said oil pushes the piston 33 contained in the cylinder 32 outwards to consequently drive the sleeve 35 contained therein, which overcomes the reaction of the cup springs 43 located in its interior so that its spherical annular surface 38 engages the respective conical portion 39 provided in the upper closing plate 40, thus, by virtue of the longitudinal slots which characterise it, causing a restriction of the annular edged sectors 42 of its end.

It thus passes from the rest position of FIG. 4a to that shown in FIG. 4b. At this point, with the final approach of the two main parts 10 and 50, said annular sectors 42 penetrate into the coupling member 71 contained between the plate 51 and upper member 59 of the separable main part of the gun, and the hydraulic pressure operating the piston 33 ceases only at this moment so that the cup springs 43 which oppose the sleeve 35 urge the piston 33 towards its rest position, to consequently induce the conical surface 38 engaged in the spherical surface 39 to abandon this as shown in FIGS. 1 and 5, so causing the annular sectors 42 to expand (because of their resilience), and hook on to the coupling member 71, so providing the stable coupling between the two main parts. At the same time, the sensor 19 of FIGS. 3 and 9 becomes located in front of its opposing element 55, and provides a signal to the manipulator control system which analyses whether the gun is the correct one, and then initiates normal working.

In order to change this gun, the manipulator carries out the reverse movements to those described, and deposits this gun on its support, passes to a new gun, recouples the new gun and begins a new welding cycle.

FIGS. 10 to 13 show a second embodiment of the device according to the invention.

The difference between this and the embodiment heretofore described is that the feed ducts 13 for the cooling water and oil operating the electrode closure cylinder of the welding gun are now present in a number greater than those of the preceding embodiment, the ducts 62 of the fixed part of the gun being present in a number equal to the ducts 13.

The reference numerals on the drawings 10 to 13 for the parts corresponding to those previously illustrated remain unchanged for obvious reasons of simplicity of description.

The advantage offered by this second embodiment is only that of being able to attain one or more intermediate closure positions for the gun.

In this respect, for certain operations it can be useful to keep the gun semi-closed during non-working passage from one weld to the next, and so on for a long series of welds of the same type.

Thus, if the gun is not completely open each time one weld is terminated, considerable down-time, i.e. non-working time is saved, and the sum of the times saved is such that the entire welding cycle can take place in a much shorter overall time.

Thus by providing more than one set of feed and return ducts 13, 62, at least one intermediate position of the gun can be programmed (the more ducts provided the more the number of intermediate positions which can be attained).

What we claim is:

1. An automatic device for changing an electric welding gun, operated by an arm of a programmable manipulator and disposed between the end of said arm of a programmable manipulator and an electric welding gun, comprising two elements (10, 50) which are rigid with said manipulator arm (11) and a welding gun respectively, and which can be connected together in a separable manner; means (19) for checking the correct selection of the chosen type of gun and for checking that said element (10) carried by the arm (11) has properly approached this latter, lead-in guide means (22, 60) between the two elements for their mutual insertion, means (42, 71) for releasably coupling together the two elements at the end of their mutual insertion movement, and valve units (31) which automatically open during the coupling together of the two elements in order to directly connect together ducts (13) in the two elements for the passage of a liquid for cooling electrical contacts (15, 16) and electrodes (63) and oil for a closing cylinder (33) thereof, the electrical connection between the manipulator and gun being made by means of two male (66) and female (16) contacts, one provided on the element (10) rigid with the arm (11) and the other in the element (50) rigid with the gun and being coupled together at the moment in which said elements (10, 50) become connected together.

2. A device as claimed in claim 1, in which the means for checking the selection of the type of gun comprises a plurality of proximity sensors (19) on the element (10) carried by the arm, and which, in association with the manipulator, identifies the type of gun by means of corresponding opposition members (55) on the element (50) carried by said gun.

3. A device as claimed in claim 1, in which the lead-in guide means (22, 60) are a plurality of cylinders (23) provided with a conical head (22) and projecting from the element (10) carried by the arm, for insertion into corresponding cavities (61) in the element (50) carried by the gun.

4. A device as claimed in claim 1, in which the coupling releasable means (42, 71) are formed by resilient ends (35) projecting from the element (10) carried by the arm in which it is contained, and hooking by means of a hook portion (71) into corresponding teeth on the element (50) carried by the gun.

5. A device as claimed in claim 4, in which the resilient ends (35) form part of a sleeve confined to a piston (33), slidable in a hollow cylindrical portion (32) of the element (10) carried by the arm by means of hydraulic operation against elastic means (43) of said element.

6. A device as claimed in claim 1, in which said valve units (31) are constituted by a plunger (26) slidably contained in a sleeve (25) of said element carried by the arm and gun respectively, said plunger (26) being urged by elastic means (30) so that it closes an external communication port of the sleeve (25), and comprising an end portion (31) projecting from said port such that when the two elements are connected together, heads (31) of two facing valve units resiliently urge each other to open communication ports between sleeves carrying said valve units.

7. A device is claimed in claim 1, in which said electrical contacts are copper blocks (14) carried by each element and provided with male cones (66) and female cones (16) for their fitting together, each male cone (66) being provided with resilient (68) guide means (67) for the centering and secure connection of the female cone (16) into which it is inserted when the two elements are connected together.

8. A device as claimed in claim 1, in which said passage ducts (13) for the oil for the electrode closing cylinder and thus the relative valve units are several in number in order to allow at least one further intermediate electrode position between the completely open and completely closed positions to be identified and maintained.

* * * * *